United States Patent
Lyons et al.

(10) Patent No.: US 6,628,243 B1
(45) Date of Patent: Sep. 30, 2003

(54) PRESENTING INDEPENDENT IMAGES ON MULTIPLE DISPLAY DEVICES FROM ONE SET OF CONTROL SIGNALS

(75) Inventors: George Lyons, Langley (CA); William Low, Van Couver (CA)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/458,263

(22) Filed: Dec. 9, 1999

(51) Int. Cl.[7] .................................................. G09G 5/00
(52) U.S. Cl. ............................ 345/1.1; 345/3.1; 345/98
(58) Field of Search ........................... 345/1.1, 1.2, 1.3, 345/3.1, 3.2, 208, 209, 210, 211, 212, 213, 214, 1, 9, 87, 90, 98, 99, 100, 204

(56) References Cited

U.S. PATENT DOCUMENTS

| | | | | |
|---|---|---|---|---|
| 4,965,559 A | * | 10/1990 | Dye ............................. 345/2.2 |
| 5,488,385 A | * | 1/1996 | Singhal et al. ................ 345/3.1 |
| 5,694,141 A | * | 12/1997 | Chee ............................ 345/3.1 |
| 5,896,116 A | * | 4/1999 | Torizuka et al. ............... 345/87 |
| 6,088,045 A | * | 7/2000 | Lumelsky et al. ............ 345/531 |
| 6,297,785 B1 | * | 10/2001 | Sommer et al. ............... 345/1.1 |
| 6,297,786 B1 | * | 10/2001 | Kakuta et al. ................ 345/1.1 |
| 6,424,323 B2 | * | 7/2002 | Bell et al. ....................... 345/9 |

* cited by examiner

*Primary Examiner*—Vijay Shankar
*Assistant Examiner*—Mansour M. Said

(57) ABSTRACT

Multiple independent images are presented on multiple display devices by driving the display devices with a common set of control signals and a multiplexed set of data signals that convey information representing interleaved components of each independent image. In a preferred embodiment, a unique clock signal is provided to each respective display device that is aligned with the interleaved components of the image to be presented by that respective display. The control, data and clock signals may be obtained by multiplexing control and data signals received from display pipeline circuits, or by generating the, signals using a composite circuit that implements the features of two or more multiplexed display pipeline circuits.

47 Claims, 14 Drawing Sheets

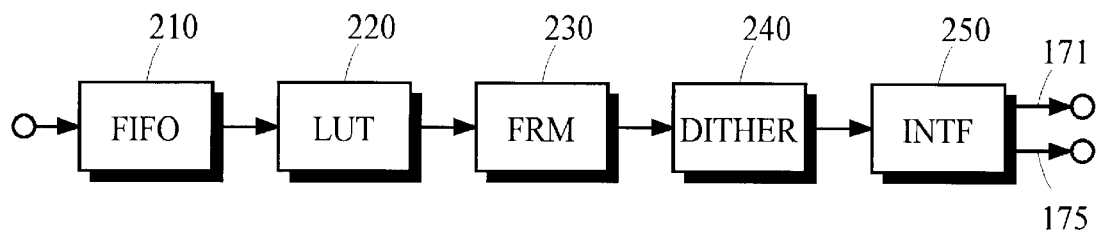
Fig. 3A
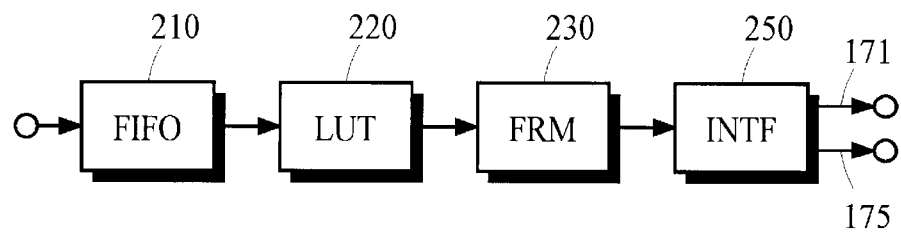
Fig. 3B
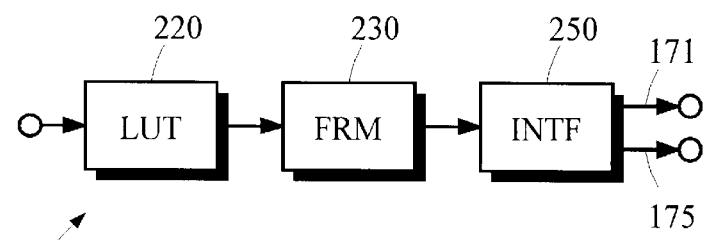
Fig. 3C
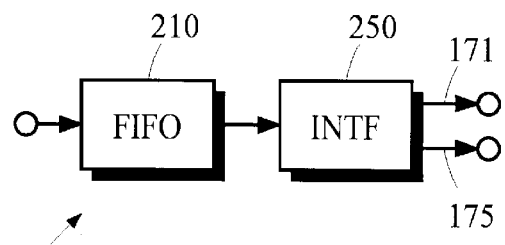 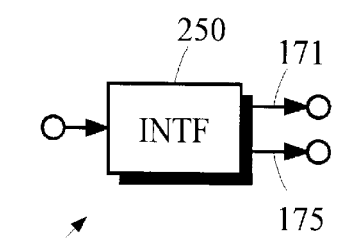
Fig. 3D   Fig. 3E

PRESENTING INDEPENDENT IMAGES ON MULTIPLE DISPLAY DEVICES FROM ONE SET OF CONTROL SIGNALS

TECHNICAL FIELD

The present invention pertains to digital display devices such as liquid crystal display panels and related interface circuitry that may be used to display images. The present invention is related more particularly to the presentation of two or more independent images on a plurality of digital display devices using one set of control signals.

BACKGROUND ART

Digital display devices such as liquid crystal display (LCD) panels, thin-film-transistor (TFT) panels and plasma panels are used in various applications such as personal computer systems and micro-processor based industrial controllers to present visual images. Digital display devices are being incorporated into additional types of applications as manufacturing costs of the display devices continue to decrease. One relatively new application is the so called electronic book in which one or more digital display devices are arranged to display text and graphics in a manner that resembles pages in a conventional book.

Electronic circuitry sometimes referred to as a video adapter or a display controller provides an interface between a digital display device and various other components that provide the digital information representing an image to be displayed. In typical applications, a display controller receives a set of input digital signals that represent components of the image to be displayed and, in response, generates a set of output digital signals that cause an attached digital display device to present the desired image. The output digital signals are generated by the display controller to meet the input signal requirements of the display device.

There is a growing demand for devices and systems that use multiple display devices to present independent images. Two display devices may be used in personal computer systems to display independent images such as different areas of a virtual desktop, the visual presentation of two different computer applications that are executing simultaneously, or two independent visual presentations of a single computer application. For example, numerical data in an electronic spreadsheet may be presented by one display device and a corresponding graphical display of the numerical information may be presented by a second display device. In the electronic book application mentioned above, two display devices may be used to present independent images that represent different pages in a book.

Two ways are known for providing an interface between two display devices and the other components that provide digital information representing two independent images. One way uses separate display controllers for each display device. This approach allows essentially any type of display device to be used for either image but it is often not an attractive solution because of the space and power required by the circuitry of the two independent display controllers, and for the space required for all of the connectors needed to connect the circuits to multi-conductor cables. Two independent controllers may also be incompatible with one another, causing the apparatus in which the controllers are used to malfunction.

A second way to interface two display devices is disclosed in U.S. Pat. Nos. 5,488,385 and 5,694,141, which are incorporated herein by reference. According to this approach, interfaces for two display devices are provided by one display controller having some common circuitry shared by both display devices and some distinct circuitry for each display device. The use of common circuitry reduces the space and power required to provide the interfaces for two display devices but the use of distinct circuitry for each display device does not reduce the space required for circuit connectors.

There are a number of applications such as the electronic book application mentioned above in which two identical, or at least very similar, display devices are used to present independent images. In such applications, the flexibility provided by distinct circuitry is not needed and the space and power required by this circuitry is a disadvantage.

DISCLOSURE OF INVENTION

It is an object of the present invention to provide an efficient interface for presenting independent images by two or more digital display devices operating according to the same or similar input signal requirements and to reduce implementation costs by reducing the space required by the circuitry and the number of connectors required to connect to the circuitry. This object is achieved by the present invention as described below and as set forth in the claims.

According to one aspect of the present invention, an apparatus includes input-interface circuitry that receives data signals representing a plurality of independent images and associated control signals; memory; a memory controller in communication with the input-interface circuitry and the memory to control writing information into and reading information from the memory, wherein the information corresponds to the data signals representing the plurality of independent images; one or more display-pipeline circuits in communication with the memory to receive the information representing the plurality of independent images; and output terminals in communication with the one or more display-pipeline circuits, wherein the output terminals provide a first clock signal and a plurality of output-data signals conveying interleaved components of the plurality of independent images, and wherein the output-data signals conveying components for a first of the plurality of independent images are aligned with the first clock signal.

According to a second aspect of the present invention, a system includes processor circuitry that generates data signals representing a plurality of independent images and associated control signals; input-interface circuitry in communication with the processor circuitry to receive the data signals and the associated control signals; memory; memory controller in communication with the input-interface circuitry and the memory to control writing information into and reading information from the memory, wherein the information corresponds to the data signals representing the plurality of independent images; one or more display-pipeline circuits in communication with the memory to receive the information representing the plurality of independent images; output terminals in communication with the one or more display-pipeline circuits, wherein the output terminals provide a first clock signal and a plurality of output-data signals conveying interleaved components of the plurality of independent images, and wherein the output-data signals conveying components for a first of the plurality of independent images are aligned with the first clock signal; and a plurality of display devices in communication with the output terminals, wherein a respective display device presents a respective one of the plurality of independent images.

According to a third aspect of the present invention, a method for transmitting signals representing two or more independent images for presentation by two or more display devices generates a sequence of first signal components representing components of a first image, wherein a respective first signal component represents a respective component of the first image; generates a sequence of second signal components representing components of a second image that is independent of the first image, wherein a respective second signal component represents a respective component of the second image; and transmits along a data-signal channel the first signal components interleaved with the second signal components and transmitting along a control-signal channel a first clock signal, wherein a respective first signal component is aligned with a respective cycle of the first clock signal.

According to a fourth aspect of the present invention, an apparatus for transmitting signals representing two or more independent images for presentation by two or more display devices includes means for generating a sequence of first signal components representing components of a first image, wherein a respective first signal component represents a respective component of the first image; means for generating a sequence of second signal components representing components of a second image that is independent of the first image, wherein a respective second signal component represents a respective component of the second image; and means for transmitting along a data-signal channel the first signal components interleaved with the second signal components and transmitting along a control-signal channel a first clock signal, wherein a respective first signal component is aligned with a respective cycle of the first clock signal.

According to a fifth aspect of the present invention, each of a plurality of display devices includes a plurality of image-data signal input connections; a plurality of display-control signal input connections; a clock signal input connection; control circuitry having inputs in communication with the image-data signal input connections, the display-control signal input connections and the clock signal input connection; and a display screen in communication with outputs of the control circuitry; wherein respective image-data signal input connections for the plurality display devices are coupled together and respective display-control signal input connections for the plurality display devices are coupled together, and respective clock signal input connections for the plurality of display devices are coupled to sources of respective clock signals.

According to a sixth aspect of the present invention, an electrical socket includes a plurality of electrical connections used to convey signals representing two or more independent images for presentation by two or more display devices, wherein the electrical connections include a first clock-signal connection that conveys a first clock signal; and a plurality of data-signal connections that convey a sequence of first signal components interleaved with a sequence of second signal components, wherein a respective first signal component represents a respective component of a first image, a respective second signal component represents a respective component of a second image that is independent of the first image, and a respective first signal component is aligned with a respective cycle of the first clock signal.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIGS. 3A to 3E are schematic illustrations of several display-pipeline circuits.

MODES FOR CARRYING OUT THE INVENTION

A. Overview

1. General Apparatus

Figure 1:
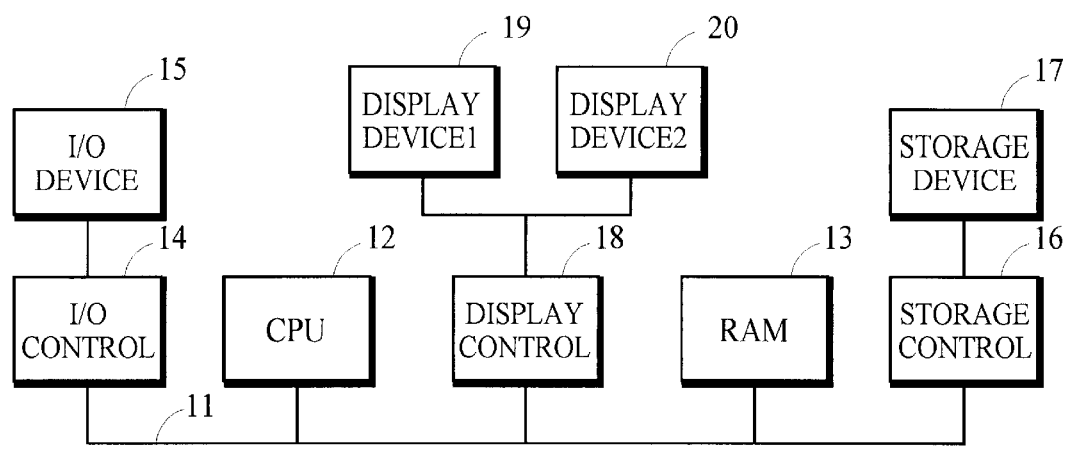
FIG. 1 is a schematic block diagram of a computer system in which various aspects of the present invention may be incorporated.

A display controller according to the present invention may be implemented in a number of ways and incorporated into a wide variety of systems and apparatuses including a personal computer system. FIG. 1 is a block diagram of computer system 10 that may incorporate a display controller according to the present invention. CPU 12 provides computing resources. I/O control 14 represents an interface to input/output device 15 such as a keyboard, mouse or printer. Storage control 16 represents an interface to storage device 17 that includes a storage medium such as magnetic tape or disk, or an optical medium. The storage medium may be used to record programs of instructions for operating systems, utilities and applications. Display control 18, which may incorporate various aspects of the present invention, provides an interface to display devices 19 and 20. RAM 13 is system random access memory (RAM). This memory should not be confused with any memory that may exist in display control 18.

In the embodiment shown, all major system components connect to bus 11, which may represent more than one physical bus. For example, some personal computers incorporate only one bus that conforms to the so called Industry Standard Architecture (ISA) or some variant of ISA. Other computers incorporate an additional bus such as a higher bandwidth bus conforming to some bus standard such as the PCI local bus standard. A bus architecture is not required to practice the present invention.

In an alternative apparatus such as one suitable for use in an electronic book application, input/output device 15 could be a set of buttons and storage control/device 16, 17 could be replaced by non-volatile memory such as some form of programmable read-only memory.

The functions of one or more of these components can be implemented in a wide variety of ways including discrete logic components, one or more ASICs and/or program-controlled processors. The type of implementation is not critical.

2. Display Controller
a) Basic Features

Figure 2:
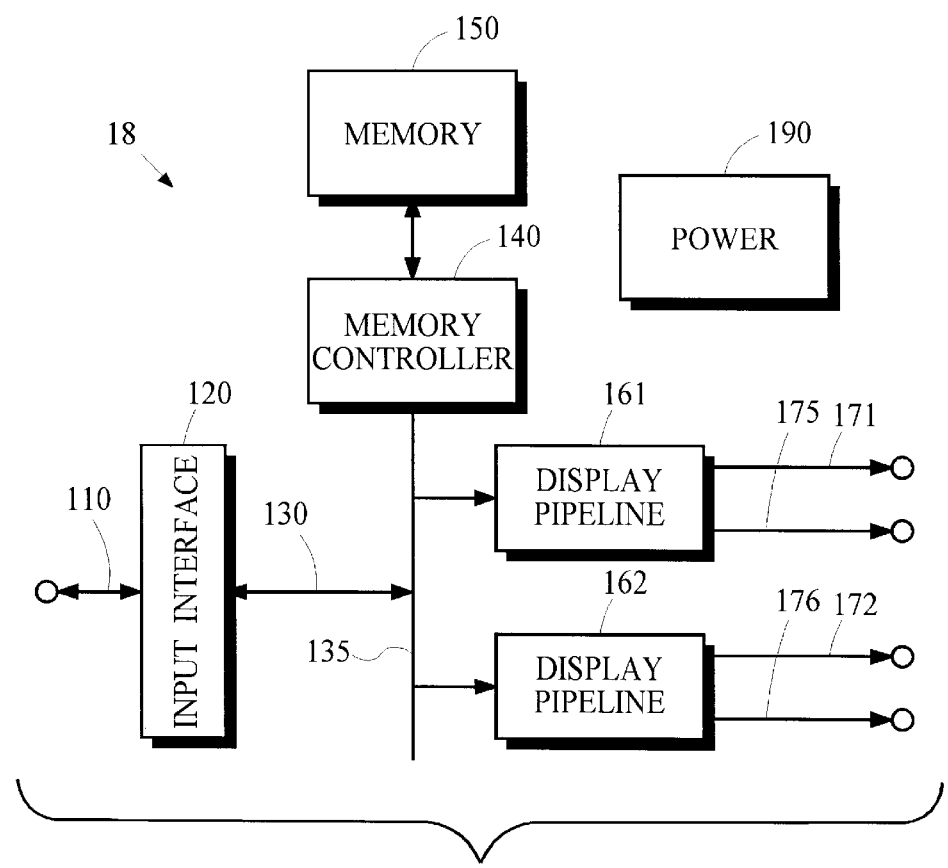
FIG. 2 is a schematic illustration of a display controller with multiple display-pipeline circuits that provide independent images to multiple display devices.

A schematic illustration of one implementation of display control 18 is provided in FIG. 2. The particular implementation illustrated in the figure includes a "display-pipeline" circuit for each of two independent images to be displayed by two display devices 19, 20 and is merely one example of an implementation that may advantageously incorporate various aspects of the present invention.

According to this implementation, display control 18 includes circuitry in input interface 120 that couples to signal path 110, perhaps provided by bus 1, that carries digital signals representing one or more images to be displayed. Input interface 120 receives from path 110 the data signals that represent image content, converts these data signals into a form that is compatible with other components in display control 18, and passes the converted data signals along path 130 to controller bus 135. Other signals such as interrupts, clocks and timing references are not shown for illustrative clarity.

The data signals on controller bus 135 are received by memory controller 140 and corresponding information is written into memory 150. A wide variety of technologies including dynamic RAM, single- and dual-port video RAM, and implementations that conform to different versions of the Advanced Graphics Port (AGP) standard may be used to implement memory 150. Subsequently, memory controller 140 reads the information stored in memory 150 and passes this information to the appropriate display pipeline 161, 162. In response to the information passed to display pipeline 161, the circuitry in this display pipeline generates a sequence of data and control signals along path 175 that correspond to the content of an image and generates along path 171 a clock signal that is needed by display device 19 to present the image represented by the signals on path 175. Similarly, in response to the information passed to display pipeline 162, the circuitry in this display pipeline generates a sequence of data and control signals along path 176 that correspond to the content of an image and generates along path 172 a clock signal that is needed by display device 20 to present the image represented by the signals on path 176.

Power 190 represents power management circuits for display control 18. These power management circuits may be used to reduce or turn off power to one or more attached display devices to conserve energy. Although such features may be used in conjunction with the present invention, they are not essential.

b) Display Pipeline Circuits

The circuits of display pipelines 161, 162 may be implemented in a wide variety of ways and may include one or more components that facilitate controlling the operation of different types of digital display devices. Several combinations of components are shown schematically for display pipeline 161 in FIGS. 3A to 3E and are described below.

Referring to FIG. 3A, display pipeline 161 includes first-in-first-out (FIFO) buffer 210, look-up table (LUT) 220, frame-rate modulator (FRM) 230, dithering circuit 240, and device interface 250.

In many implementations, the flow of information from memory 150 to any of the display pipelines 161, 162 may be interrupted by an event that demands the immediate services of memory 150 or memory controller 140. FIFO 210 may be used in such implementations to reduce the likelihood that such interruptions will disrupt the flow of information to the display devices coupled to the display controller.

Look-up-table functions provided by LUT 220 may be used to perform a variety of signal conversions such as, for example, mapping representations of color from one color space into another to provide color calibration for a particular display device.

Frame-rate modulation provided by FRM 230 is especially useful with certain types of passive LCD display devices to present images with a finer range of colors.

Dithering as provided by dither 240 may be used to reduce moire patterns that might otherwise appear in images presented by a digital display device.

Interface 250 provides a suitable electrical interface to a connected display device and generates along paths 175 and 171 the appropriate data, control and clock signals needed by the display device to present the desired image.

FIGS. 3B through 3E schematically illustrate display pipelines that include other combinations of components. No particular combination of components is essential to practice the present invention. Referring to FIG. 3E, for example, display pipeline 161 contains only interface 250. The functions provided by FIFO 210, LUT 220, FRM 230 and dither 240 are not used in this implementation.

For ease of discussion, some of the examples and implementations discussed below assume the display pipeline circuits are implemented according to the implementation that is shown in FIG. 3B.

c) Memory Operation (1) Writing Information to Memory

Under the control of memory controller 140, information representing components of one or more images is written into memory 150. As used herein, the term "component" refers to some unit of information such as a single picture element ("pixel") or a set of one or more bits that represent fractional or multiple pixels. For example, a "component" could be eight bits of digital information that in some applications or display modes corresponds to two 4-bit pixels and in other applications corresponds to only a portion of a 16-bit pixel. As another example, a "component" could be some unvarying number of pixels having a number of bits that varies according to the desired application or display mode. A component of four pixels would comprise thirty-two bits for a display mode in which a single 8-bit pixel may represent 256 shades of gray, and would comprise ninety-six bits for a display mode in which a single 24-bit pixel may represent sixteen million colors. Throughout this disclosure, more particular mention is made of implementations in which an image "component" corresponds to a single pixel, however, in principle, no particular component is essential.

Information representing the components of two independent images may be stored in memory 150 in essentially any manner. For example, FIGS. 7A and 7B illustrate two different arrangements for storing a raster of pixels arranged in 480 lines of 640 pixels for each of two images.

Figures 7A, 7B:
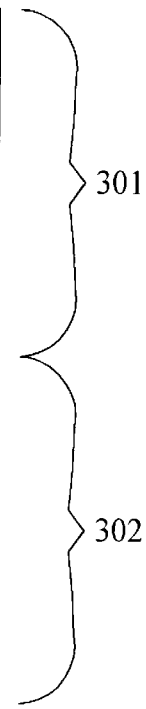
FIGS. 7A and 7B are schematic illustrations of arrangements for storing components of two independent images in memory.

According to the example illustrated in FIG. 7A, information representing the pixels for each image are stored in contiguous memory locations. Portion 301 of memory space 300 stores pixel information for the first image and portion 302 of memory space 300 stores pixel information for the second image. Within each portion of memory, the pixel information for each image is stored in raster order. For example, the memory location for the first pixel in line 1 of image 1, denoted 1:1-1, precedes the memory location for the second pixel in line 1 of image 1, denoted 1:1-2. The memory location for the last pixel in line 1, denoted 1:1-640, precedes the memory location for the first pixel in line 2, denoted 1:2-1. The memory location for the last pixel in the last line of image 1 is denoted 1:480-640. A similar storage arrangement is provided for the pixel information of image 2, which extends from the memory location for the first pixel, denoted 2:1-1, to the memory location for the last pixel, denoted 2:480-640.

According to the example illustrated in FIG. 7B, information representing the pixels for each image are stored in interleaved memory locations. For example, the memory location for the first pixel in line 1 of image 1, denoted 1:1 -1, precedes the memory location for the first pixel in line 1 of image 2, denoted 2:1 -1, which in turn precedes the memory location for the second pixel in line 1 of image 1, denoted 1:1-2.

(2) Reading Information from Memory

In the implementation shown in FIG. 2, information for components of a first image is read from memory 150 and passed to display pipeline 161, and information for components of a second image is read from memory 150 and passed to display pipeline 162. The concept of "component" discussed above also applies to the information that is read from memory and passed to the display pipeline circuits. Preferably, information for each "component" that is read from memory 150 corresponds exactly to the information for each "component" that is written into memory 150; however, this is not essential. For example, information representing components of multiple pixels may be written into memory 150 and information representing components of single pixels may be read from memory 150 thereafter.

For ease of discussion, the examples and implementations discussed herein generally assume that information passed to and processed by the display pipeline circuits represents components of single pixels. Accordingly, display controller 140 reads information from memory 150 in packets or segments that represent individual pixels and passes these one-pixel segments along controller bus 135 to the appropriate display pipeline circuit.

(3) Virtual Image

Figure 8:
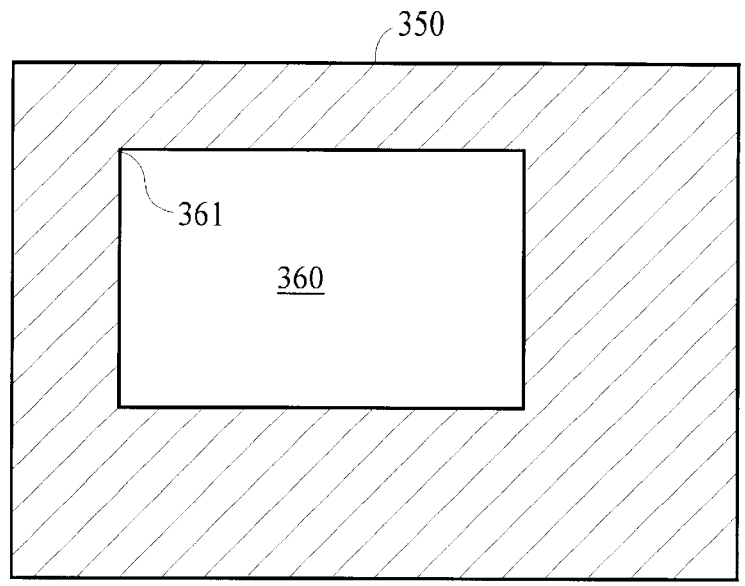
FIG. 8 is a schematic illustration of a virtual image stored in memory.

If desired, an implementation of display control 18 may store in memory 150 information for components of a "virtual" image that extends beyond what can be presented by a particular display device. Referring to FIG. 8, region 350 represents the information stored in memory 150 for a particular virtual image and region 360 represents the amount of information that can be presented at one time by a particular display device. After all of the information for the virtual image is stored in memory 150, display control 18 may efficiently perform scrolling and panning within the virtual image.

The information that is to be read from memory 150 and passed to display pipelines 161, 162 may be specified by parameters, which can be stored in memory 150 or stored in control registers not shown in the illustrated implementation, that specify the vertical and horizontal dimensions of the image that can be presented by the attached display device and that identify the alignment between the entire virtual image and the image that is actually presented by the display device. In the hypothetical example illustrated in FIG. 8, this alignment is specified by a parameter that identifies the location of vertex 361, which is the upper left-hand corner of the displayed image.

d) Other Features

In addition to the features discussed herein, display control 18 may incorporate other features such as cache memory, "blt block" engines, and specialized circuitry for three-dimensional rendering or texture-mapping to improve performance, and may incorporate video input/output ports that support a wider range of video applications. Although these and other features may be used in implementations that incorporate various aspects of the present invention, a discussion of these features is not needed to understand the present invention.

Figure 4:
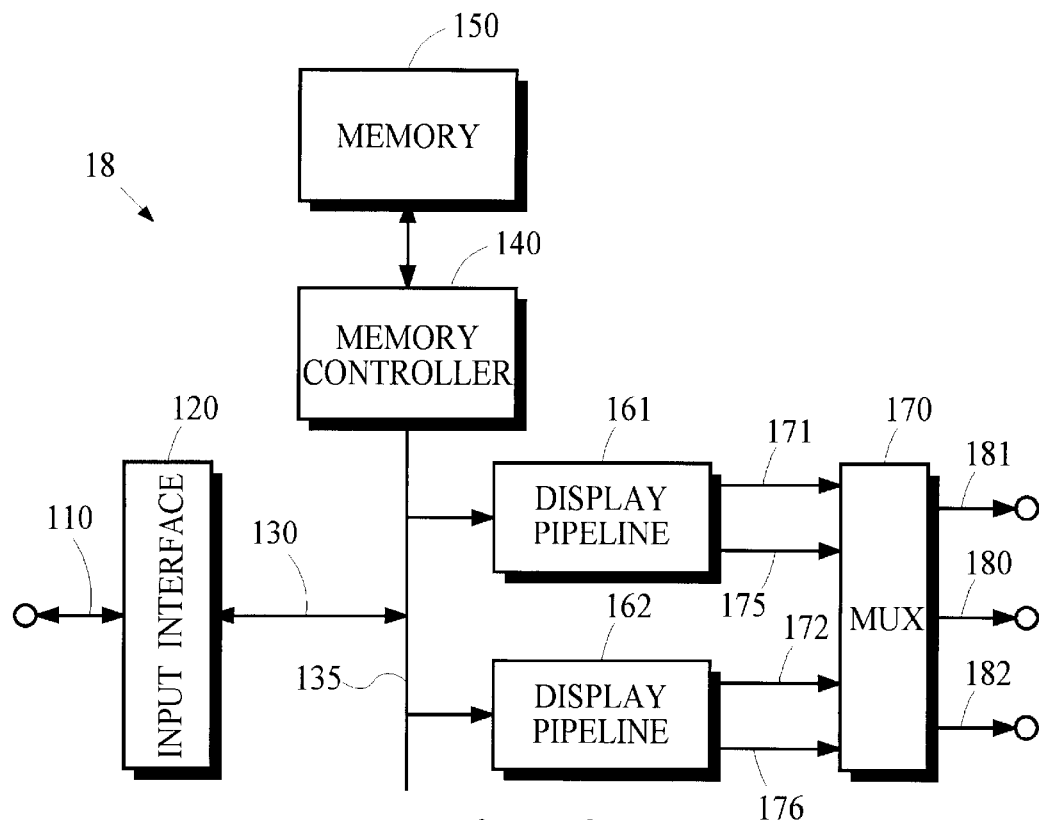
FIG. 4 is a schematic illustration of a display controller that multiplexes the output of two display-pipeline circuits.
Figure 5:
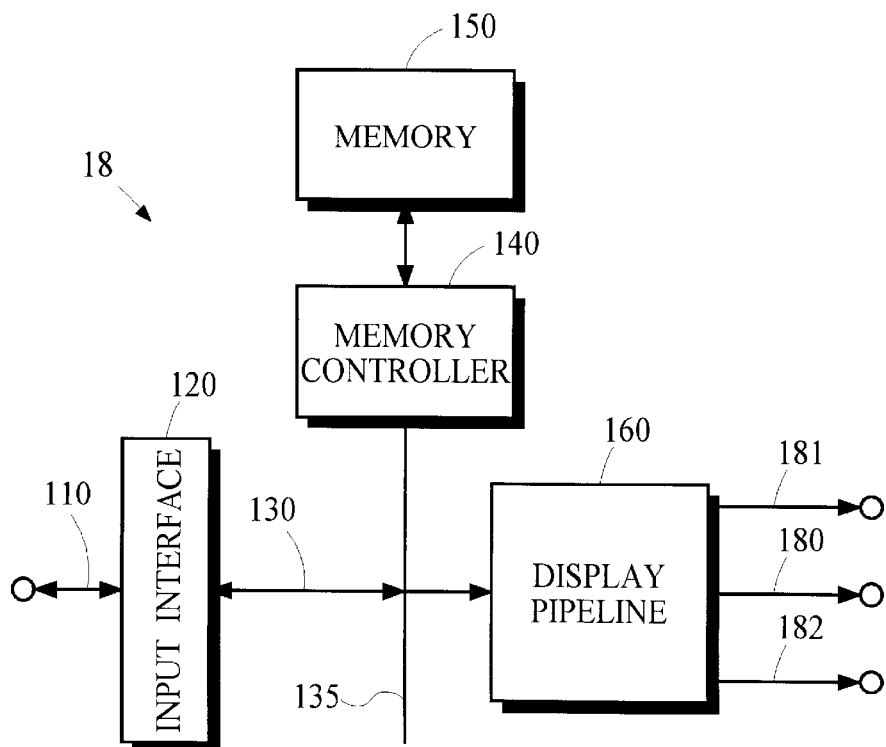
FIG. 5 is a schematic illustration of a display controller with one composite display-pipeline circuit that provides independent images to multiple display devices.

In addition, aspects of the present invention may be incorporated into implementations of display controllers that differ from the implementations discussed herein and illustrated in FIGS. 2, 4 and 5. For example, the use of a bus architecture in general and the use of controller bus 135 in particular is not required. Furthermore, display pipelines 160, 161, 162 may be provided with direct access to memory 150. In this sense, the display pipelines are said to be coupled to memory 150 without limitation to whether or not there is an intervening memory controller between the memory and the display pipeline circuits.

e) Output Signals (1) Image Frames

Figure 9:
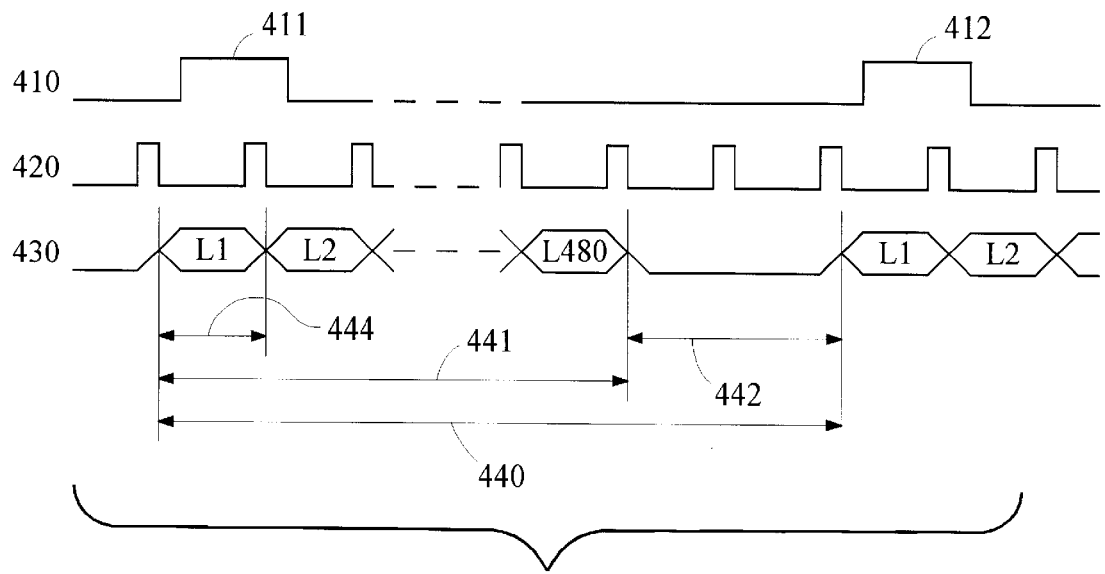
FIG. 9 is a graphical illustration of hypothetical data and control signals representing lines of a raster image arranged in frames.

According to the following examples, each display pipeline circuit generates data and control signals representing components of an image arranged in 480 lines of 640 pixels each. A hypothetical example of these signals according to one implementation, which is illustrated schematically in FIG. 9, includes vertical synchronization signal 410, sometimes referred to as FPFRAME, horizontal synchronization signal 420, sometimes referred to as FPLINE, and data signals 430.

Referring to vertical synchronization signal 410, pulses 411 and 412 indicate the start of information for a respective frame or image picture. In horizontal synchronization signal 420, each pulse indicates the beginning of information for a respective line in the image frame. Interval 440 represents the duration of a single frame, interval 441 represents the duration of the visible portion of the frame, sometimes referred to as the vertical display period (VDP), and interval 442 represents the duration of the non-visible portion of the frame, sometimes referred to as the vertical non-display period (VNDP). Interval 444 represents the interval for a single line of information.

The portions of data signals 430 denoted L1, L2 and L480 are segments of one or more digital signals that represent pixels in lines 1, 2 and 480 of a respective image frame. Additional details for some of the control signals and data signals 430 according to several different implementations are discussed below.

(2) Image Lines for Passive Display Devices
(a) Monochrome Device

A hypothetical example of control and data signals that are suitable for operating certain types of display devices including some passive LCD panels is illustrated schematically in FIGS. 10A to 10F.

Figure 10A:
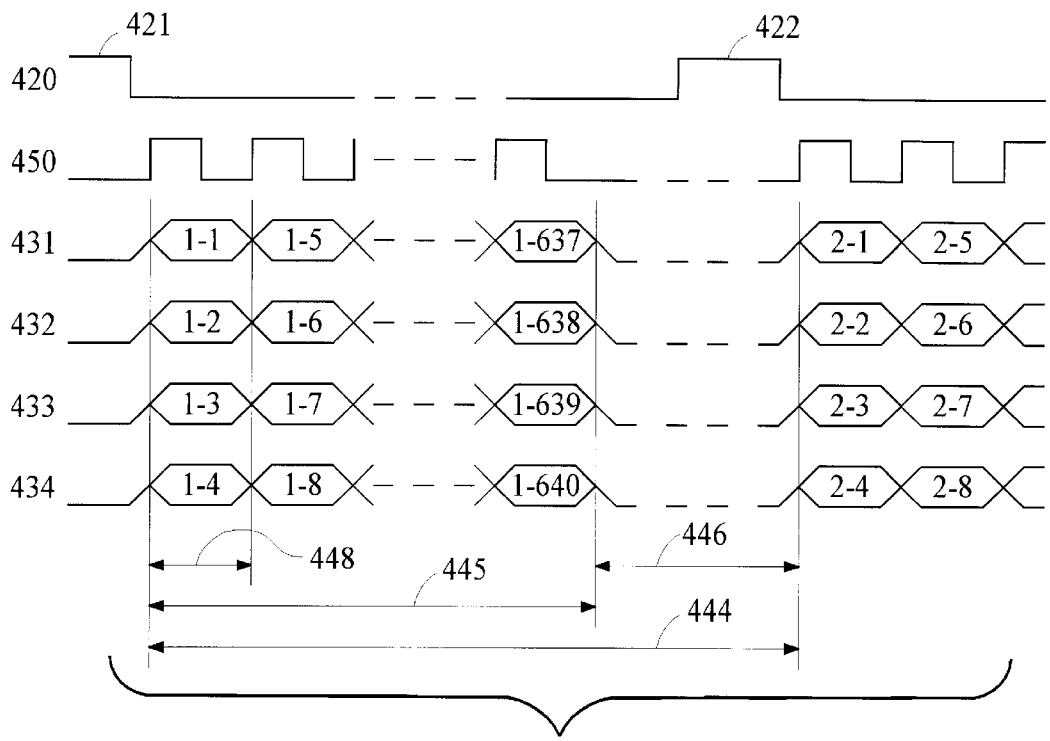
FIGS. 10A to 10F are graphical illustrations of hypothetical data and control signals representing pixels of a raster image arranged in lines for presentation on a digital display device such as a passive LCD panel.

The hypothetical example shown in FIG. 10A illustrates an implementation in which four data signals 431 through 434 convey information for a monochrome raster image arranged in lines of 640 pixels each. Pulses 421 and 422 in horizontal synchronization signal 420 indicate the beginning of information for line 1 and line 2, respectively, in an image frame. The portions denoted 1-1, 1-5, 1-637, 2-1 and 2-5, respectively, represent segments of digital signal 431 that convey information for pixels 1, 5 and 637 in line 1 and pixels 1 and 5 in line 2 of the image frame. Portions denoted 1-2, 1-6, 1-638, 2-2 and 2-6, respectively, represent segments of digital signal 432 that convey information for pixels 2, 6 and 638 of line 1 and pixels 2 and 6 of line 2 of the image frame. Similarly, segments of signals 433 and 434 convey information for other pixels in lines 1 and 2 of the image frame.

Interval 444 represents the signal interval for a line of information. Interval 445 represents the duration of the visible portion of a line, sometimes referred to as the horizontal display period (HDP), and interval 446 represents the duration of the non-visible portion of the line, sometimes referred to as the horizontal non-display period (HNDP). Interval 448 represents the interval for a respective data signal to convey a single pixel of information.

In the example shown, each pixel or component of image information is aligned with a transition of clock signal 450, sometimes referred to as FPSHIFT. In this particular example as well as in other examples discussed herein, the component information is aligned with a downward transition in clock signal 450; however, the data may be aligned with any point of the clock signal cycle. The alignment should satisfy any input signal requirements of the display device that is used to present the image; however, no particular alignment is critical in concept to practice the present invention.

Figure 10B:
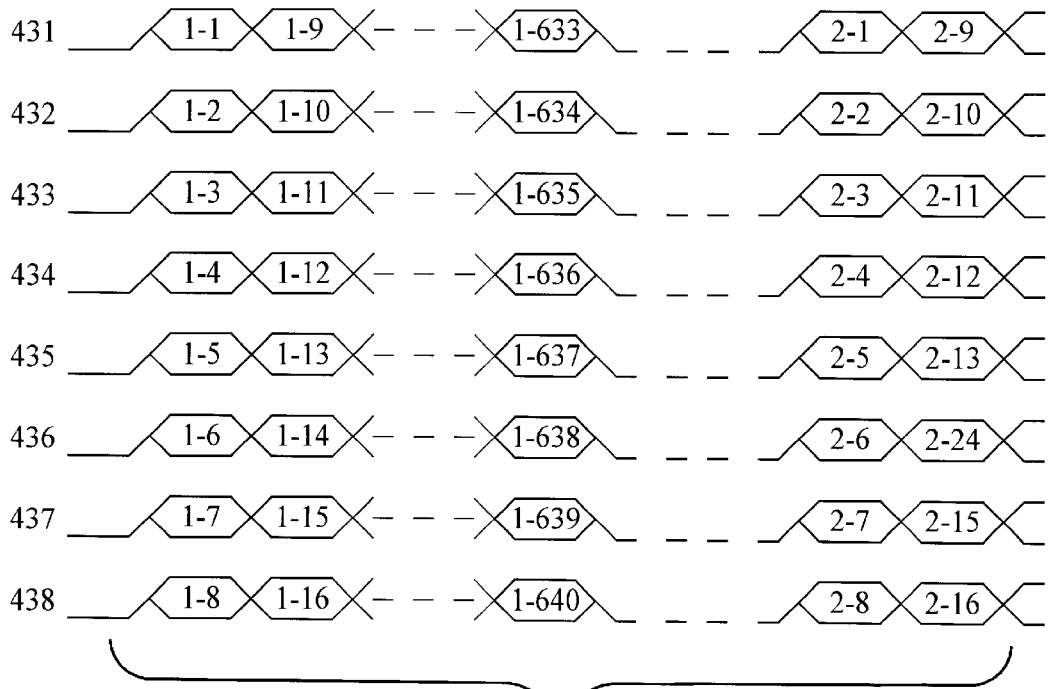

The hypothetical example shown in FIG. 10B illustrates an implementation in which eight data signals 431 through 438 convey information for a monochrome raster image arranged in lines of 640 pixels each. Other control and clock signals are omitted from this as well as other figures for illustrative clarity.

(b) Color Device

Figure 10C:

The hypothetical example shown in FIG. 10C illustrates an implementation in which eight data signals 431 through 438 convey red, green and blue (RGB) information for a color raster image arranged in lines of 640 pixels each. According to this implementation in the portions of the signals illustrated in the figure, digital signal 431 conveys information for the red portion of pixel 1 in line 1, denoted 1-R1, conveys information for the blue portion of pixel 3 in line 1, denoted 1-B3, conveys information for the green portion of pixel 638 in line 1, denoted 1-G638, conveys information for the red portion of pixel 1 in line 2, denoted 2-R1, and conveys information for the blue portion of pixel 3 in line 2, which is denoted 2-B3. The RGB portions of other pixels are conveyed by digital signals 432 through 438 as shown.

Figure 10D:
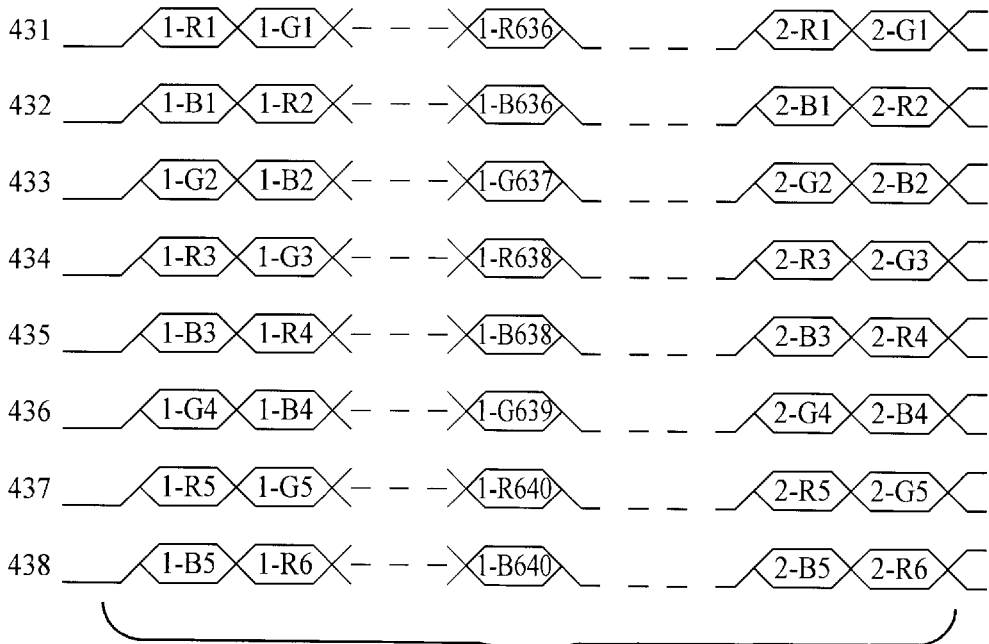

The hypothetical example shown in FIG. 10D illustrates an another implementation in which eight data signals 431 through 438 convey RGB information for a color raster image arranged in lines of 640 pixels each. This implementation is similar to the one illustrated in FIG. 10C except for the order in which the RGB information for the pixels is conveyed.

(c) Dual-Panel Device

Figure 10E:
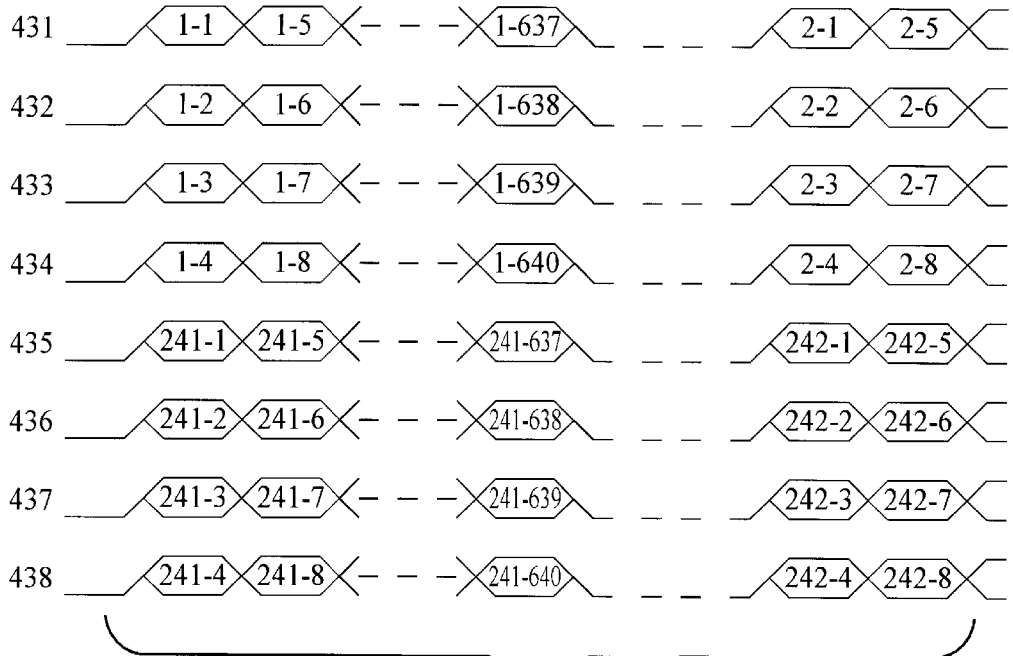

The hypothetical example shown in FIG. 10E illustrates an implementation in which eight data signals 431 through 438 convey information for a monochrome raster image arranged in lines of 640 pixels each for presentation on a dual-panel display device. The first panel of the device displays lines 1 through 240 of the image. The second panel displays lines 241 through 480 of the image.

According to this implementation in the portions of the signals illustrated in the figure, digital signal 431 conveys information for pixels 1, 5 and 637 of line 1 and pixels 1 and 5 of line 2, and digital signal 435 conveys information for pixels 1, 5 and 637 of line 241 and pixels 1 and 5 of line 242. Information for other pixels are conveyed by signals 432 through 434 and 436 through 438 as shown.

Figure 10F:
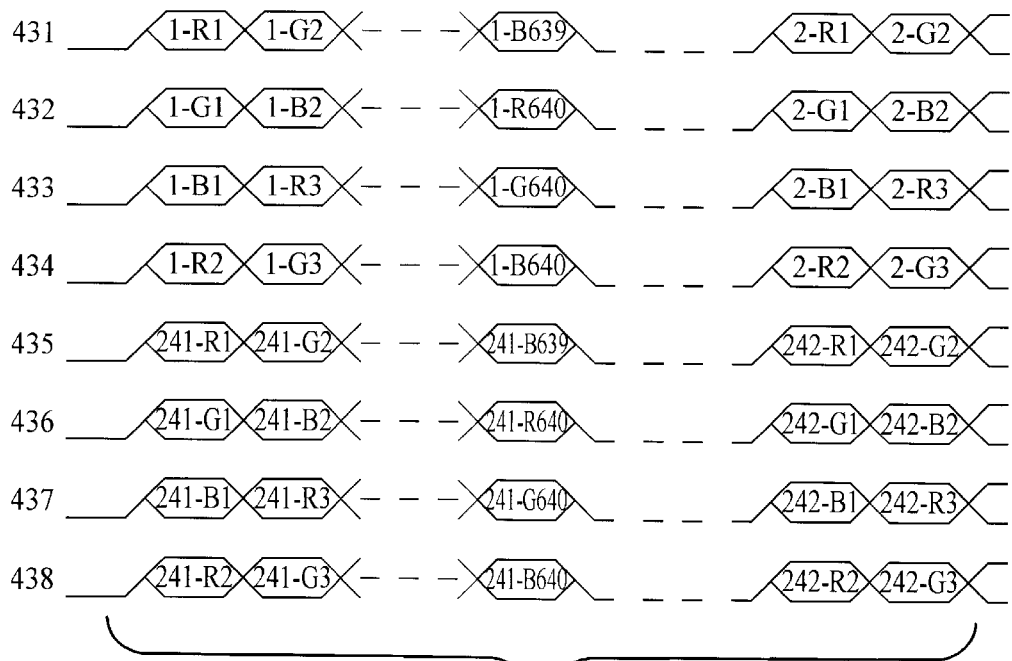

The hypothetical example shown in FIG. 10F illustrates an implementation in which eight data signals 431 through 438 convey RGB information for a color raster image arranged in lines of 640 pixels each for presentation on a dual-panel display device. The first panel of the device displays lines 1 through 240 of the image. The second panel displays lines 241 through 480 of the image.

According to this implementation in the portions of the signals illustrated in the figure, digital signal 431 conveys information for the red portion of pixel 1 in line 1, conveys information for the green portion of pixel 2 in line 1, conveys information for the blue portion of pixel 639 in line 1, conveys information for the red portion of pixel 1 in line 2, and conveys information for the green portion of pixel 2 in line 2. The RGB portions of other pixels in lines 1, 2, 241 and 242 are conveyed by digital signals 432 through 438 as shown.

(3) Active Display Device

Figure 11A:
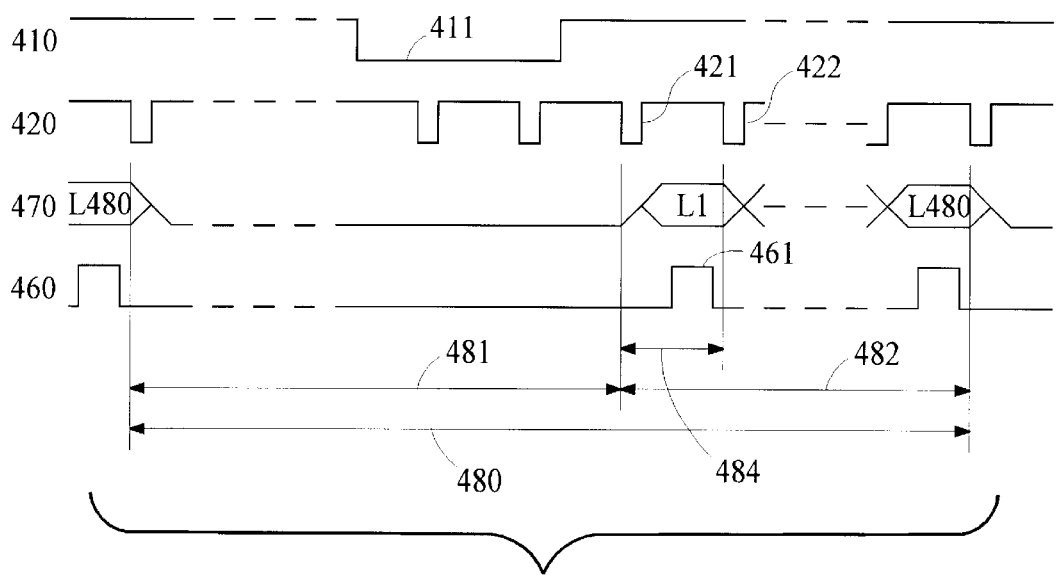
FIGS. 11A and 11B are graphical illustrations of hypothetical data and control signals representing pixels of a raster image arranged in lines for presentation on a digital display device such as a TFT panel.
Figure 11B:
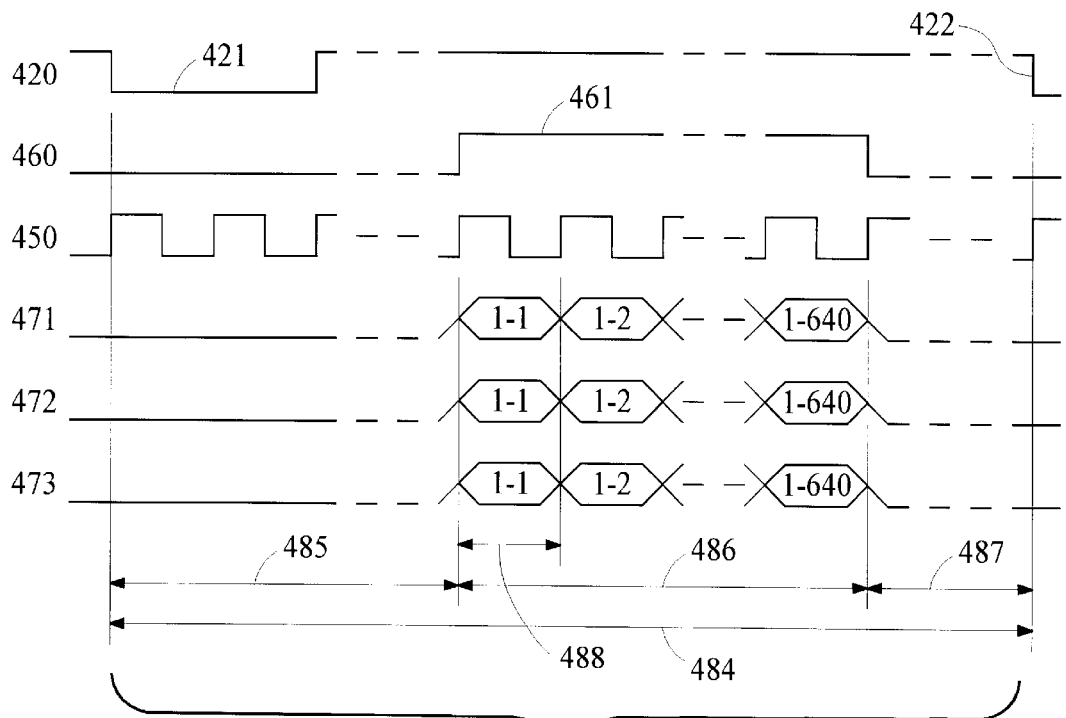

According to another implementation of display control 18 that is suitable for use with certain types of color display devices such as some TFT panels, each display pipeline circuit generates data and control signals similar to those shown in FIGS. 11A and 11B. In the hypothetical example illustrated schematically in FIG. 11A, negative pulse 411 in vertical synchronization signal 410 indicates the beginning of an image frame that comprises 480 lines, and each negative pulse in horizontal synchronization signal 420 indicates the beginning of information for a respective line in the frame. Pulse 461 of data ready signal 460 indicates the interval during which data signals 470 convey valid RGB information for line 1, which is denoted L1, of an image frame.

Interval 480 represents the duration of a single frame, interval 481 represents the duration of the vertical display period (VDP), and interval 482 represents the duration of the vertical non-display period (VNDP). Interval 484 represents the interval for a single line of information.

Additional detail for digital signals 470 is shown in FIG. 11B. In this example, digital signals 471, 472 and 473 convey red, green and blue information, respectively, for pixels 1 through 640 of line 1 in the image frame. In the segments denoted 1-1, for example, digital signals 471 through 473 convey RGB information for the first pixel of line 1.

In a manner similar to that discussed above, each pixel or component of image information is aligned with a respective down transition of clock signal 450; however, in principle the data may be aligned with any point of the clock signal cycle. The alignment should satisfy any input signal requirements of the display device that is used to present the image.

Interval 484 represents the duration of a single line of information. Interval 486 represents the duration of the horizontal display period (HDP), and intervals 485 and 487 represent first and second portions of the horizontal non-display period (HNDP). Interval 488 represents the interval for a single pixel of information.

(4) Other Signals

The examples discussed above are presented to show that various aspects of the present invention may be incorporated into display controllers that implement a variety of signal configurations and timings to convey components of image information. The important feature is a set of one or more control signals for each display device that are sufficiently similar to one another, if not identical, to permit one set of control signals being shared by the multiple display devices.

Other signals may be needed to operate particular types of display devices. For example, some passive LCD panels require an alternating voltage signal, sometimes referred to as a MOD signal, that switches polarity near the start of each frame. Although these additional signals may be essential to properly operate certain types of display devices, they are not needed to explain the concepts of the present invention and are not specifically discussed herein.

B. Multiplexed Display Pipelines

One basic way in which the present invention may be carried out is to multiplex the signals generated by two or more display pipeline circuits. This may be accomplished by the display controller illustrated in FIG. 4. In the particular example shown in the figure, display control 18 operates substantially in the same manner as the display controller illustrated in FIG. 2 and discussed above. The basic difference is the addition of multiplexor 170, which multiplexes the signals provided by display pipelines 161 and 162.

1. Two Independent Images

Multiplexor 170 receives from display pipeline 161 a clock signal generated along path 171 and a set of control and data signals for a first image that are generated along path 175. Multiplexor 170 receives from display pipeline 162 a clock signal generated along path 172 and a set of control and data signals for a second image that are generated along path 176. In response, multiplexor 170 generates along path 181 a first clock signal and generates along path 180 a set of control signals and a set of data signals that comprise multiplexed or interleaved components of the first and second images. In preferred embodiments, multiplexor 170 also generates along path 182 a second clock signal.

Figure 12A:
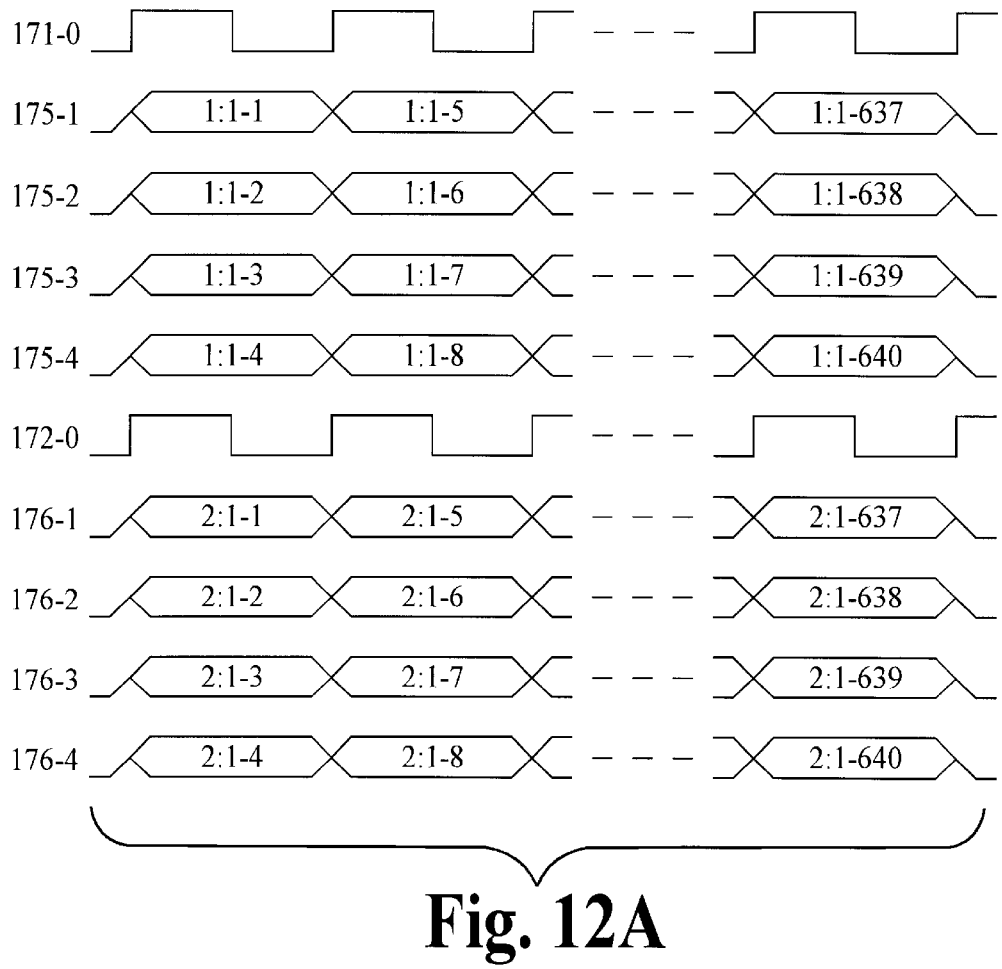
FIG. 12A is a graphical illustration of hypothetical data and clock signals representing components of two images.

A hypothetical example of some of the signals that are received by multiplexor 170 are shown in FIG. 12A. Digital signals 175-1 through 175-4, which are received from path 175, convey information for components of a first monochrome raster image arranged in lines of 640 pixels each. The information for each pixel component within signals 175-1 through 175-4 is aligned with a down transition of clock signal 171 -0, which is received from path 171. Similarly, digital signals 176-1 through 176-4, which are received from path 176, convey information for components of a second monochrome raster image arranged in lines of 640 pixels each. The information for each pixel component within signals 176-1 through 176-4 is aligned with a down transition of clock signal 172-0, which is received from path 172. Various control signals such as the vertical and horizontal synchronization signals are not shown for illustrative clarity.

In preferred embodiments, the control and data signals received from display pipelines 161, 162 are aligned with one another, and clock signals 171-0, 172-0 are identical. In principle, no particular alignment is essential. If the sets of signals are aligned, however, the control signals provided by either display pipeline circuit may be used to operate identical display devices 19, 20 that are coupled to display control 18. In this situation, the control signals provided by either display pipeline may be passed or regenerated along path 180.

Although it is anticipated that the present invention will generally be used to operate multiple display devices that are essentially identical, the present invention does allow for some variation in the display devices provided each device is compatible with a common set of input signal specifications.

Figure 12B:
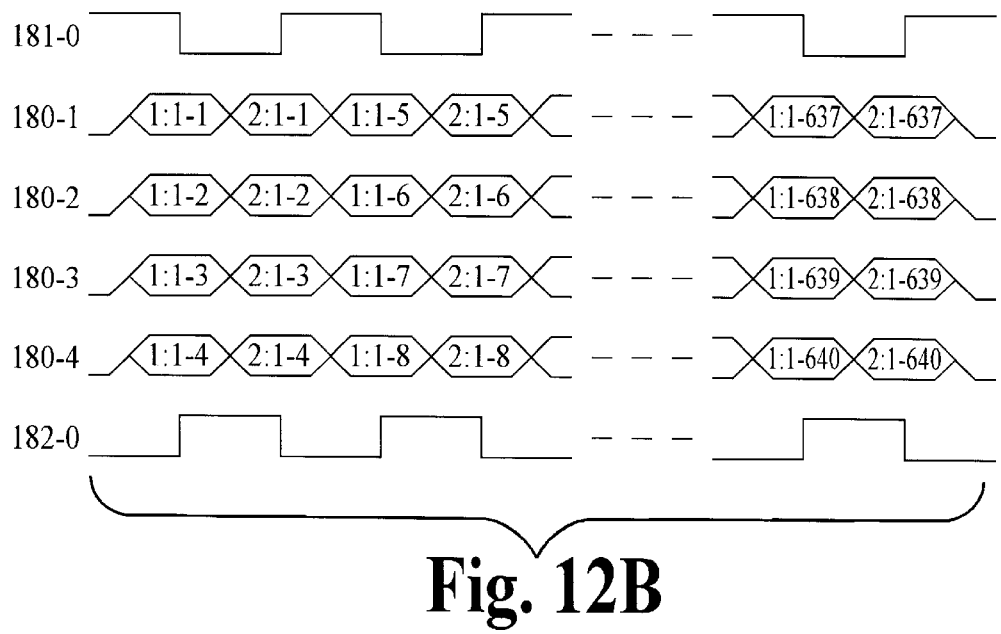
FIG. 12B is a graphical illustration of hypothetical data and clock signals representing interleaved components of two images.

A hypothetical example of some of the signals that are provided at the output of multiplexor 170 are shown in FIG. 12B. Digital signals 180-1 through 180-4, which are generated along path 180, convey information representing interleaved components of the first and second images. The illustrated portion of digital signal 180-1, for example, shows an interleaved sequence of components representing pixels 1, 5 and 637 in line 1 of the first and second images. Information for each of the components of the first image are aligned with down transitions of clock signal 181 -0, which is generated along path 181. Similarly, information for each of the components of the second image are aligned with down transitions of clock signal 182-0, which is generated along path 182. In preferred embodiments, clock signal 182-0 is an inverse replica of clock signal 181-0. As explained above, no particular alignment is essential; however, in preferred embodiments, an alignment is provided that meets the input signal requirements of the display devices coupled to paths 180, 181 and 182 that are used to present the first and second images.

2. Additional Independent Images

The display controller illustrated in FIG. 4 may be used to provide independent images to more than two display devices by incorporating a display pipeline circuit for each device and multiplexing the information components for all of the images. Hypothetical signals for three images are shown in FIGS. 12C and 12D.

Figure 12C:
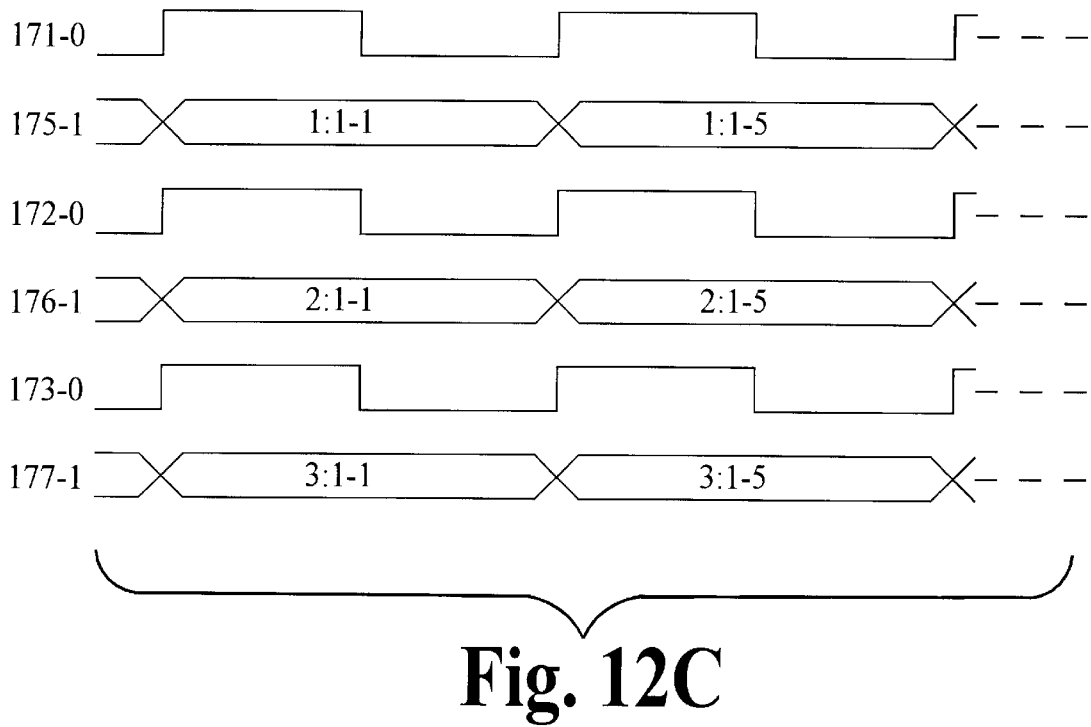
FIG. 12C is a graphical illustration of hypothetical data and clock signals representing components of three independent images.

Referring to FIG. 12C, digital signals 175-1, 176-1 and 177-1 convey information for components of a first, second and third image, respectively. The information for each pixel component within signal 175-1 is aligned with a down transition of clock signal 171-0, and the information for each pixel component within signals 176-1 and 177-1 are aligned with down transitions of clock signals 172-0 and 173-0, respectively. Control and other data signals are not shown for illustrative clarity.

Figure 12D:
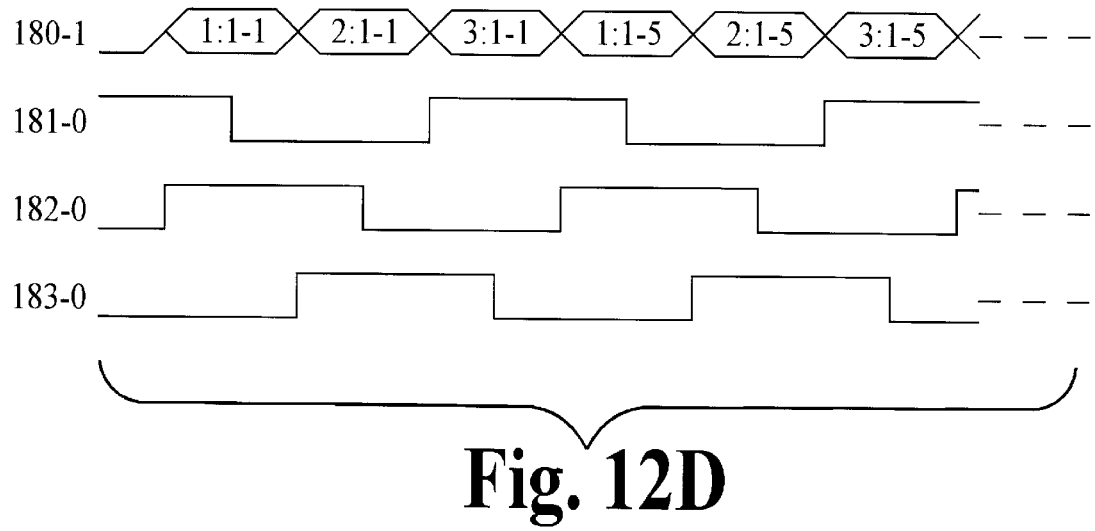
FIG. 12D is a graphical illustration of hypothetical data and clock signals representing interleaved components of three images.

Referring to FIG. 12D, some of the signals that are provided at the output of multiplexor 170 include digital signal 180-1 and clock signals 181-0, 182-0 and 183-0. The illustrated portion of digital signal 180-1 shows an interleaved sequence of components representing pixels 1 and 5 in line 1 of the first, second and third images. Information for each of the components of the first image are aligned with down transitions of clock signal 181-0. Similarly, information for each of the components of the second and third images are aligned with down transitions of clock signals 182-0 and 183-0, respectively. As mentioned above, control and other data signals are not shown for illustrative clarity.

In principle, this technique may be extended to support any number of images.

C. Composite Display Pipeline

Another basic way in which the present invention may be carried out is to provide a composite display pipeline circuit that generates a multiplexed set of data signals and accompanying control and clock signals that may be used to operate two or more display devices. This may be accomplished by the display controller illustrated in FIG. 5. In the particular example shown in the figure, display control 18 operates substantially in the same manner as the display controller illustrated in FIG. 2 and discussed above. The basic difference is composite display pipeline 160.

Display pipeline 160 may be implemented in a wide variety of ways. A few examples are shown in FIGS. 6A through 6D.

Figure 6A:
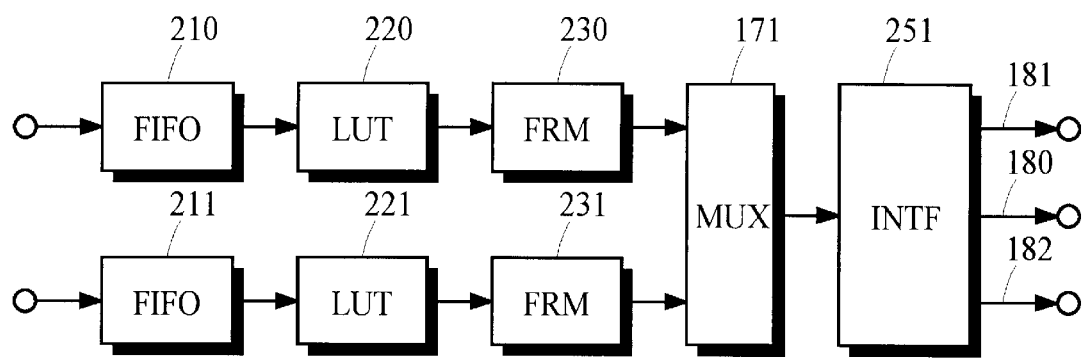
FIGS. 6A to 6E are schematic illustrations of several composite display-pipeline circuits.

In the example shown in FIG. 6A, circuits for FIFO 201, 211, LUT 220, 221 and FRM 230, 231 may be implemented in a manner that is identical or substantially similar to the implementations of corresponding circuits discussed above in conjunction with FIG. 3A. Multiplexor 171 receives frame-rate modulated signals from FRM 230, 231 and multiplexes the components of the two images into a single set of interleaved signals, which are passed to interface 251. Interface 251 generates along path 180 a set of control and data signals that are suitable to drive the connected display devices, and generates clock signals along paths 181 and 182 that may be used to operate each display device. The combined operation of multiplexor 171 and interface 251 provide a set of control, data and clock signals that are equivalent to the signals provided by multiplexor 170, discussed above.

Figure 6B:
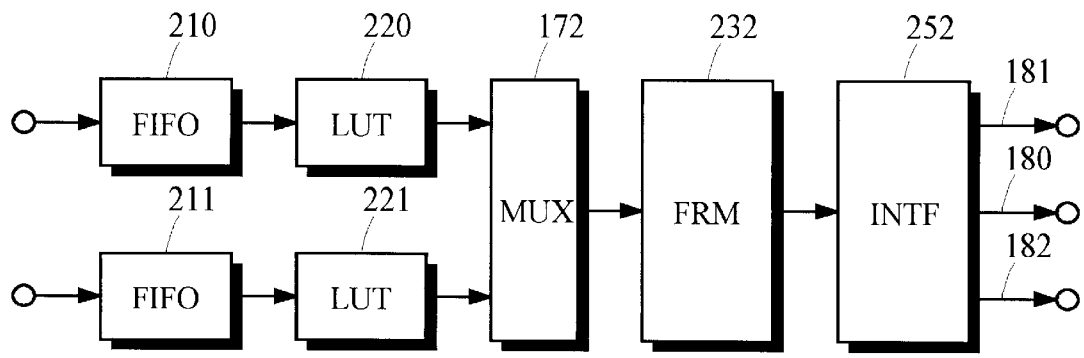

In the example shown in FIG. 6B, circuits for FIFO 201, 211 and LUT 220, 221 may be implemented as discussed above in conjunction with FIG. 3A. Multiplexor 172 receives signals from LUT 220, 221 and multiplexes the components of the two images into a single set of interleaved signals, which are passed to FRM 232. FRM 232 is adapted to frame-rate modulate the interleaved signals. Interface 252 generates along paths 180 through 182 a set of control, data and clock signals that are suitable to drive the connected display devices, as discussed above.

Figure 6C:
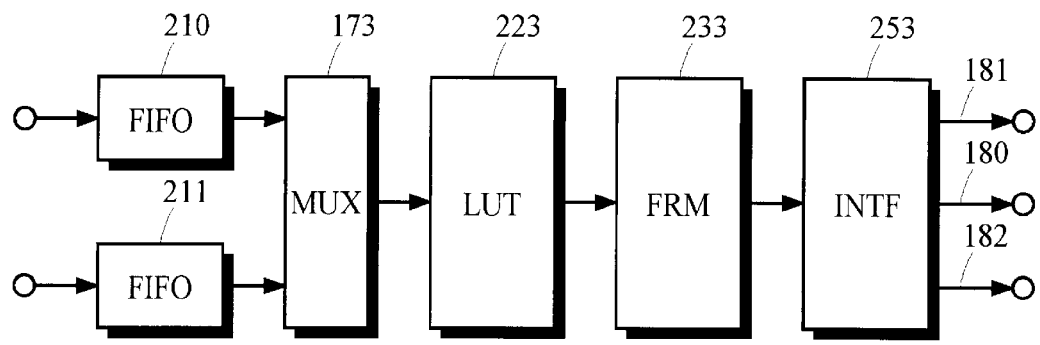

In the example shown in FIG. 6C, circuits for FIFO 210 and 211 may be implemented as discussed above in conjunction with FIG. 3A. Multiplexor 173 receives signals from FIFO 210, 211 and multiplexes the components of the two images into a single set of interleaved signals, which are passed to LUT 223. LUT 223 is adapted to perform a look-up table function for the interleaved signals. FRM 233 is also adapted to frame-rate modulate the interleaved signals. Interface 253 generates along paths 180 through 182 a set of control, data and clock signals that are suitable to drive the connected display devices, as discussed above.

Figure 6D:
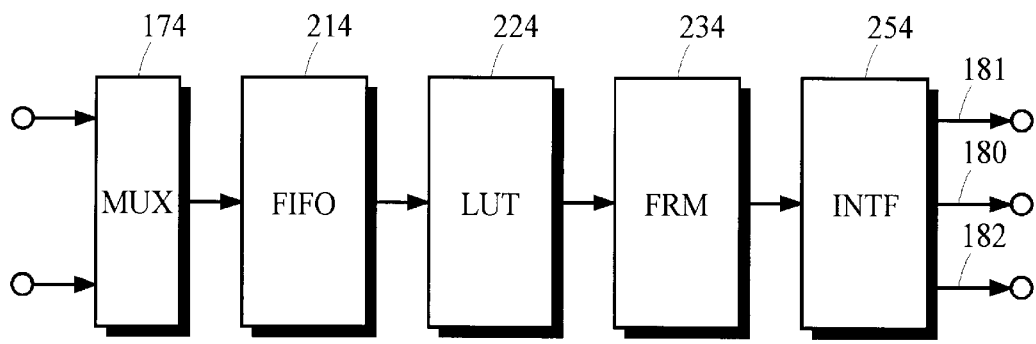

In the example shown in FIG. 6D, multiplexor 174 receives signals representing two images from memory 150 and multiplexes the components of the two images into a single set of interleaved signals, which are passed to FIFO 214. FIFO 214 provides a buffering function for the interleaved components, which in turn are passed to LUT 224. LUT 224 and FRM 233 are adapted to operate on the interleaved signals. Interface 254 generates along paths 180 through 182 a set of control, data and clock signals that are suitable to drive the connected display devices, as discussed above.

Figure 6E:
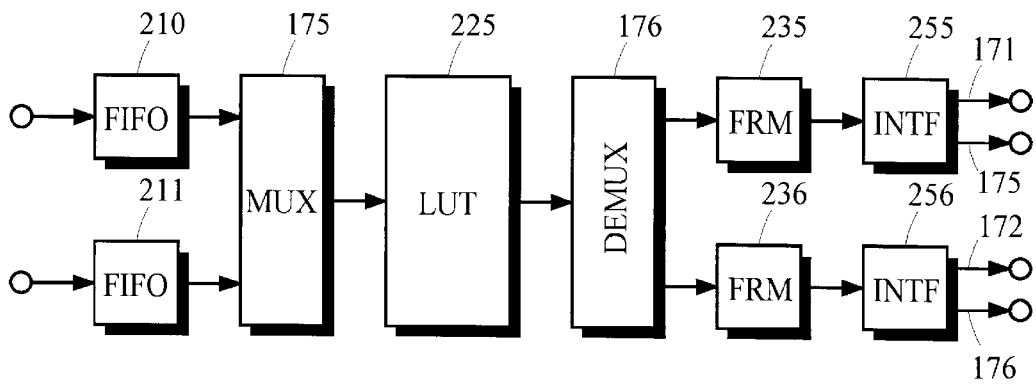

The composite display pipeline circuit shown in FIG. 6E may be incorporated into the implementation of display control 18 shown in FIG. 4. Circuits for FIFO 210, 211 may be implemented as discussed above in conjunction with FIG. 3A. Multiplexor 175 receives signals from FIFO 210 and 211 and multiplexes the components of the two images into a single set of interleaved signals, which are passed to LUT 225. LUT 225 is adapted to perform a look-up table function for the interleaved signals. Demultiplexor 176 receives the interleaved components from LUT 225 and separates the components into separate signals, which are passed to respective frame-rate modulators FRM 235, 236. Each frame-rate modulator passes its respective modulated signal to a respective interface 255, 256. The output signals from interface 255, 256 are then passed to multiplexor 160, as shown in FIG. 4.

The composite circuits illustrated in FIGS. 6A through 6E each implement two display pipeline circuits that are equivalent to the display pipeline circuit illustrated in FIG. 3B. These specific examples may be modified to implement different display pipeline circuits by removing unneeded components or by introducing needed components such a dither circuits. Furthermore, these composite implementations may be extended to provide display pipeline circuits for more than two display devices.

D. Electrical Socket

Figure 13:
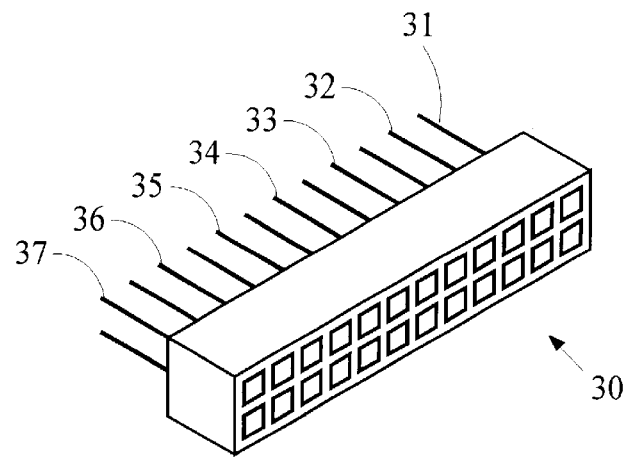
FIG. 13 is a schematic illustration of an electrical socket that may be used to convey control, data and clock signals representing multiple independent images in a manner according to the present invention.

Generally, practical embodiments of display controller 18 pass the control, data and clock signals along multi-conductor cables that are connected to various types of sockets. The use of sockets facilitates the manufacture and assembly of the various subsystems in apparatuses that incorporate the display controller. FIG. 13 is a schematic illustration of an electrical socket that may be used to convey control, data and clock signals representing multiple independent images in a manner according to the present invention. The socket shown in the figure is similar to those sockets that connect to pin headers on printed circuit boards, however, essentially any multi-connector socket may be used including the so called D connectors that are frequently provided on the case of computer systems for connection to external display devices.

Referring to FIG. 13, socket 30 comprises a plurality of electrical connectors that are coupled to pins on the reverse side of the connector. Some of the pins are referenced in the drawing as pins 31 through 37. By way of hypothetical example, pin 31 connects to signal ground, pins 32 and 33 connect to data signals such as signals 180-1 and 180-2 that convey information representing sequences of interleaved image components, pin 34 connects to a vertical synchronization signal such as signal 410, pin 35 connects to a horizontal synchronization signal such as signal 420, pin 36 connects to a clock signal such as clock signal 181-0, and pin 37 connects to a clock signal such as clock signal 182-0. Other pins of socket 30 may connect to other control and data signals as desired.

E. Interconnection of Display Devices

Figure 14:
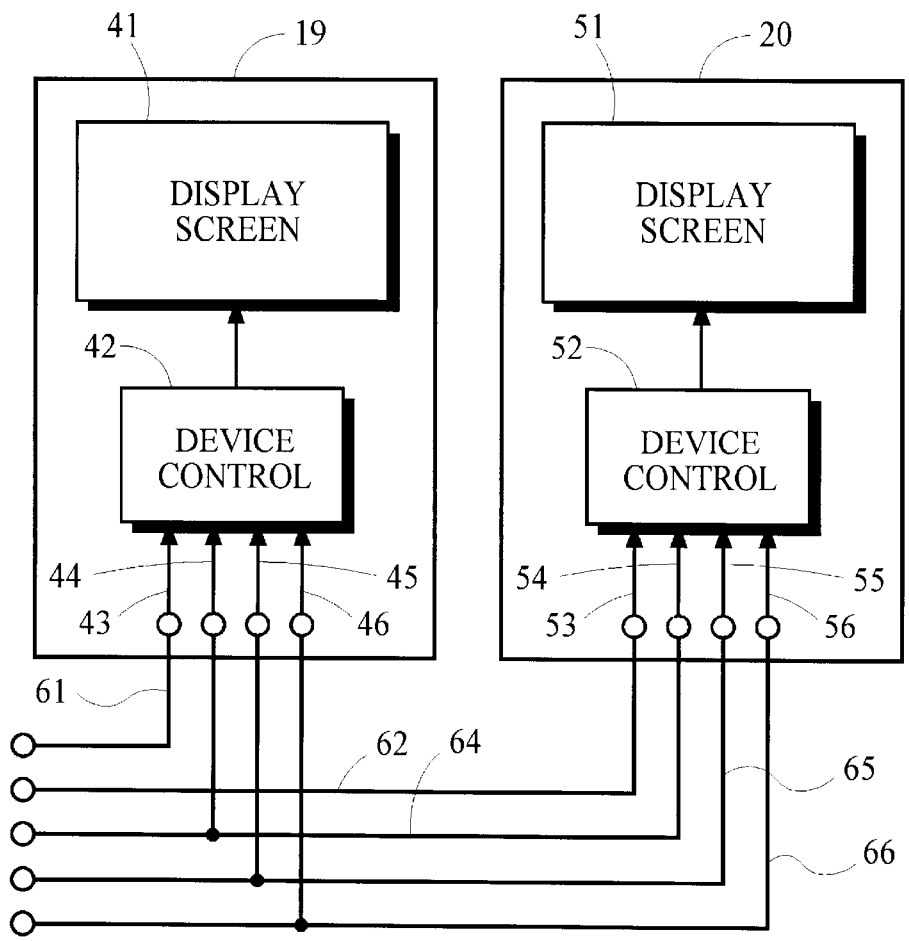
FIG. 14 is a schematic illustration of multiple display devices with input connections that are coupled together.

Display devices 19, 20 that are used with display control 18 may be coupled together as shown in FIG. 14. As shown in the schematic illustration, display device 19 comprises display screen 41, which is coupled to device control 42. The circuitry in device control 42 is coupled to two or more data signal input connections 46, a vertical synchronization signal input connection 45, a horizontal synchronization signal input connection 44, and a clock signal input connection 43.

Display device 20 comprises display screen 51, which is coupled to device control 52. The circuitry in device control 52 is coupled to two or more data signal input connections 56, a vertical synchronization signal input connection 55, a horizontal synchronization signal input connection 54, and a clock signal input connection 53.

Signal path 66 couples together input connections 46, 56 and conveys to display devices 19, 20 the data signals conveying information that represents interleaved components of two images. Signal path 65 couples together input connections 45, 55 and conveys a vertical synchronization signal to display devices 19, 20. Signal path 64 couples together input connections 44, 54 and conveys a horizontal synchronization signal to display devices 19, 20. Signal path 62 conveys a clock signal to input connection 53, and signal path 61 conveys a clock signal to input connection 43.

What is claimed is:

1. An apparatus comprising:
    input-interface circuitry that receives data signals representing a plurality of independent images and associated control signals;
    memory;
    memory controller in communication with the input-interface circuitry and the memory to control writing information into and reading information from the memory, wherein the information corresponds to the data signals representing the plurality of independent images;
    one or more display-pipeline circuits in communication with the memory to receive the information representing the plurality of independent images; and
    output terminals in communication with the one or more display-pipeline circuits, wherein the output terminals provide a first clock signal and a plurality of output-data signals conveying interleaved components of the plurality of independent images, wherein each component represents a portion of a respective image that is narrower than the respective image, and wherein the output-data signals conveying components for a first of the plurality of independent images are aligned with the first clock signal.

2. An apparatus according to claim 1 that generates a second clock signal, wherein the output-data signals conveying components for a second of the plurality of independent images are aligned with the second clock signal.

3. An apparatus according to claim 2 that generates output-data signals along a plurality of data-signal paths, generates the first clock signal along a first clock-signal path and generates the second clock signal along a second clock-signal path.

4. An apparatus according to claim 1 that generates output-data signals along a plurality of data-signal paths, and generates the first clock signal along a first clock-signal path.

5. An apparatus according to claim 1 wherein a respective component represents a pixel of a respective one of the plurality of independent images.

6. An apparatus according to claim 1 that generates a third clock signal and the output-data signals conveying components for a third of the plurality of independent images are aligned with the third clock signal.

7. An apparatus according to claim 1 that comprises only one display-pipeline circuit.

8. An apparatus according to claim 7 wherein the display-pipeline circuit comprises only one first-in-first-out buffer circuit in communication with the memory to receive signals conveying interleaved components of the plurality of independent images.

9. An apparatus according to claim 7 wherein the display-pipeline circuit comprises only one lookup-table circuit in communication with the memory to receive signals conveying interleaved components of the plurality of independent images.

10. An apparatus according to claim 1 that comprises more than one display-pipeline circuit and a multiplexing circuit in communication with the display-pipeline circuits, wherein the multiplexing circuit interleaves signals received from the display-pipeline circuits that represent components of the independent images.

11. An apparatus according to claim 10 wherein each display-pipeline circuit comprises a respective first-in-first-out buffer circuit.

12. A system comprising:
    processor circuitry that generates data signals representing a plurality of independent images and associated control signals;
    input-interface circuitry in communication with the processor circuitry to receive the data signals and the associated control signals;
    memory;
    memory controller in communication with the input-interface circuitry and the memory to control writing information into and reading information from the memory, wherein the information corresponds to the data signals representing the plurality of independent images;
    one or more display-pipeline circuits in communication with the memory to receive the information representing the plurality of independent images;
    output terminals in communication with the one or more display-pipeline circuits, wherein the output terminals provide a first clock signal and a plurality of output-data signals conveying interleaved components of the plurality of independent images, wherein each component represents a portion of a respective image that is narrower than the respective image, and wherein the output-data signals conveying components for a first of the plurality of independent images are aligned with the first clock signal; and
    a plurality of display devices in communication with the output terminals, wherein a respective display device presents a respective one of the plurality of independent images.

13. A system according to claim 12 that generates a second clock signal, wherein the output-data signals conveying components for a second of the plurality of independent images are aligned with the second clock signal.

14. A system according to claim 13 that generates output-data signals along a plurality of data-signal paths, generates the first clock signal along a first clock-signal path and generates the second clock signal along a second clock-signal path.

15. A system according to claim 12 that generates output-data signals along a plurality of data-signal paths, and generates the first clock signal along a first clock-signal path.

16. A system according to claim 12 wherein a respective component represents a pixel of a respective one of the plurality of independent images.

17. A system according to claim 12 that generates a third clock signal and the output-data signals conveying components for a third of the plurality of independent images are aligned with the third clock signal.

18. A system according to claim 12 that comprises only one display-pipeline circuit.

19. A system according to claim 18 wherein the display-pipeline circuit comprises only one first-in-first-out buffer circuit in communication with the memory to receive signals conveying interleaved components of the plurality of independent images.

20. A system according to claim 18 wherein the display-pipeline circuit comprises only one lookup-table circuit in communication with the memory to receive signals conveying interleaved components of the plurality of independent images.

21. A system according to claim 12 that comprises more than one display-pipeline circuit and a multiplexing circuit in communication with the display-pipeline circuits, wherein the multiplexing circuit interleaves signals received from the display-pipeline circuits that represent components of the independent images.

22. A system according to claim 21 wherein each display-pipeline circuit comprises a respective first-in-first-out buffer circuit.

23. A method for transmitting signals representing two or more independent images for presentation by two or more display devices, the method comprising:
  generating a sequence of first signal components representing components of a first image, wherein a respective first signal component represents a respective component of the first image that is narrower than the first image;
  generating a sequence of second signal components representing components of a second image that is independent of the first image, wherein a respective second signal component represents a respective component of the second image that is narrower than the second image; and
  transmitting along a data-signal channel the first signal components interleaved with the second signal components and transmitting along a control-signal channel a first clock signal, wherein a respective first signal component is aligned with a respective cycle of the first clock signal.

24. A method according to claim 23 wherein a respective second signal component is aligned with a respective cycle of a second clock signal.

25. A method according to claim 24 wherein the second clock signal is inverted with respect to the first clock signal.

26. A method according to claim 23 wherein a respective first signal component is transmitted along the data-signal channel by generating digital signals along a plurality of data-signal paths, a respective second signal component is transmitted along the data-signal channel by generating digital signals along the plurality of data-signal paths, and the first clock signal is transmitted along the control-signal channel by generating a digital signal along a first clock-signal path.

27. A method according to claim 26 that transmits
  a vertical-synchronization signal along a vertical-synchronization-signal path, and
  a horizontal-synchronization signal along a horizontal-synchronication-signal path; and
wherein
  the data-signal channel comprises two or more data-signal paths,
  the control-signal channel comprises the first clock-signal path, the vertical-synchronization-signal path, and the horizontal-synchronization-signal path, and
  the data-signal channel and the control-signal channel convey signals that are compatible with a liquid crystal display panel.

28. A method according to claim 23 wherein a respective first signal component represents a respective pixel of the first image and a respective second signal component represents a respective pixel of the second image.

29. A method according to claim 23 that comprises:
  generating a sequence of third signal components representing components of a third image that is independent of the first and second images, wherein a respective third signal component represents a respective component of the third image that is narrower than the third image; and
  transmitting along the data-signal channel the third signal components interleaved with the first and second signal components.

30. A method according to claim 29 that comprises transmitting along the control-signal channel a second clock signal and a third clock signal, wherein a respective second signal component is aligned with a respective cycle of the second clock signal and a respective third signal component is aligned with a respective cycle of the third clock signal.

31. An apparatus for transmitting signals representing two or more independent images for presentation by two or more display devices, the apparatus comprising:
  means for generating a sequence of first signal components representing components of a first image, wherein a respective first signal component represents a respective component of the first image that is narrower than the first image;
  means for generating a sequence of second signal components representing components of a second image that is independent of the first image, wherein a respective second signal component represents a respective component of the second image that is narrower than the second image; and
  means for transmitting along a data-signal channel the first signal components interleaved with the second signal components and transmitting along a control-signal channel a first clock signal, wherein a respective first signal component is aligned with a respective cycle of the first clock signal.

32. An apparatus according to claim 31 wherein a respective second signal component is aligned with a respective cycle of a second clock signal.

33. An apparatus according to claim 31 wherein the second clock signal is inverted with respect to the first clock signal.

34. An apparatus according to claim 31 that comprises:
  means for generating digital signals along a plurality of data-signal paths to transmit a respective first signal component along the data-signal channel;
  means for generating digital signals along the plurality of data-signal paths to transmit a respective second signal component along the data-signal channel; and
  means for generating a digital signal along a first clock-signal path to transmit the first clock signal along the control-signal channel.

35. An apparatus according to claim 34 that transmits
  a vertical-synchronization signal along a vertical-synchronization-signal path, and
  a horizontal-synchronication signal along a horizontal-synchronization-signal path; and wherein the data-signal channel comprises two or more data-signal paths, the control-signal channel comprises the first clock-signal path, the vertical-synchronization-signal path, and the horizontal-synchronization-signal path, and the data-signal channel and the control-signal channel convey signals that are compatible with a liquid crystal display panel.

36. An apparatus according to claim 31 wherein a respective first signal component represents a respective pixel of the first image and a respective second signal component represents a respective pixel of the second image.

37. An apparatus according to claim 31 that comprises:

means for generating a sequence of third signal components representing components of a third image that is independent of the first and second images, wherein a respective third signal component represents a respective component of the third image that is narrower than the third image; and means for transmitting along the data-signal channel the third signal components interleaved with the first and second signal components.

38. An apparatus according to claim 37 that comprises means for transmitting along the control-signal channel a second clock signal and a third clock signal, wherein a respective second signal component is aligned with a respective cycle of the second clock signal and a respective third signal component is aligned with a respective cycle of the third clock signal.

39. A plurality of display devices each comprising:

a plurality of image-data signal input connections;

a plurality of display-control signal input connections;

a clock signal input connection;

control circuitry having inputs in communication with the image-data signal input connections, the display-control signal input connections and the clock signal input connection, wherein the control circuitry receives from the image-data signal input connections a sequence of signals representing interleaved components of a plurality of independent images and extracts therefrom those components that are aligned with a clock signal received from the clock signal input connection, and wherein each component represents a portion of a respective image that is narrower than the respective image; and a display screen in communication with outputs of the control circuitry;

wherein respective image-data signal input connections for the plurality display devices are coupled together and respective display-control signal input connections for the plurality display devices are coupled together, and respective clock signal input connections for the plurality of display devices are coupled to sources of respective clock signals.

40. A plurality of display devices according to claim 39 each having one or more liquid crystal display panels and comprising:

two or more image-data signal input connections; and the plurality of display-control signal input connections that comprise a vertical-synchronization-signal input connection, and a horizontal-synchronicaton-signal input connection.

41. A plurality of display devices according to claim 39 wherein for each respective display device the control circuitry is adapted to receive from the image-data signal input connections a sequence signals representing interleaved components of a plurality of independent images and to extract therefrom those components that are aligned with a clock signal received from the clock signal input connection.

42. A plurality of display devices according to claim 41 wherein a respective component represents a respective pixel of an image.

43. An electrical socket comprising a plurality of electrical connections used to convey signals representing two or more independent images for presentation by two or more display devices, the electrical connections comprising:

a first clock-signal connection that conveys a first clock signal; and a plurality of data-signal connections that convey a sequence of first signal components interleaved with a sequence of second signal components, wherein a respective first signal component represents a respective component of a first image that is narrower than the first image, a respective second signal component represents a respective component of a second image that is narrower than the second image, wherein the second image is independent of the first image, and a respective first signal component is aligned with a respective cycle of the first clock signal.

44. An electrical socket according to claim 43 that comprises a second clock-signal connection that conveys a second clock signal, wherein a respective second signal component is aligned with a respective cycle of the second clock signal.

45. An electrical socket according to claim 44 that comprises:

two or more data-signal connections;

a vertical-synchronization-signal connection; and a horizontal-synchronication-signal connection.

46. An electrical socket according to claim 43 that comprises:

two or more data-signal connections;

a vertical-synchronization-signal connection; and a horizontal-synchronication-signal connection.

47. An electrical socket according to claim 43 wherein a respective first signal component represents a respective pixel of the first image and a respective second signal component represents a respective pixel of the second image.

* * * * *